(12) United States Patent
Gupta

(10) Patent No.: US 7,811,506 B2
(45) Date of Patent: Oct. 12, 2010

(54) MOLD, MOLDING ASSEMBLIES AND MOLDING PROCESSES

(76) Inventor: Manoharlal Gupta, 9. Janaki Nagar Annexe, Indore 452 001, Madhya Pradesh (IN)

( * ) Notice: Subject to any disclaimer, the term of this patent is extended or adjusted under 35 U.S.C. 154(b) by 167 days.

(21) Appl. No.: 12/234,363

(22) Filed: Sep. 19, 2008

(65) Prior Publication Data

US 2009/0250848 A1    Oct. 8, 2009

Related U.S. Application Data

(63) Continuation of application No. PCT/IN2007/000033, filed on Jan. 29, 2007.

(51) Int. Cl.
*B29C 49/04* (2006.01)
*B29C 49/48* (2006.01)

(52) U.S. Cl. .................. 264/524; 264/540; 425/234; 425/524; 425/525; 425/532; 425/538; 53/453; 53/561; 53/574

(58) Field of Classification Search ................. 425/234, 425/524, 525, 532, 538; 264/524, 527, 533, 264/540; 53/453, 561, 574
See application file for complete search history.

(56) References Cited

U.S. PATENT DOCUMENTS

| | | | | | |
|---|---|---|---|---|---|
| 3,035,302 | A | * | 5/1962 | Lysobey | 425/532 |
| 3,267,185 | A | * | 8/1966 | Freeman, Jr. | 425/532 |
| 3,328,837 | A | * | 7/1967 | Moran | 53/561 |
| 3,519,705 | A | * | 7/1970 | Pannenbecker | 425/532 |
| 3,804,573 | A | * | 4/1974 | Del Piero | 425/525 |
| 4,221,760 | A | * | 9/1980 | Mnilk et al. | 264/524 |
| 2004/0071818 | A1 | | 4/2004 | Dewar | |

FOREIGN PATENT DOCUMENTS

| | | | |
|---|---|---|---|
| DE | 2457758 A | * | 6/1976 |
| JP | 6246783 A | | 9/1994 |
| JP | 6278158 A | | 10/1994 |
| JP | 7032409 A | | 2/1995 |
| JP | 8290438 A | | 11/1996 |
| JP | 2001205663 A | | 7/2001 |
| WO | 2005118255 A | | 12/2005 |

* cited by examiner

*Primary Examiner*—Robert B Davis
(74) *Attorney, Agent, or Firm*—Lucas & Mercanti, LLP

(57) ABSTRACT

The invention discloses a mold, a molding assembly and a molding process for molding two tier array of containers of synthetic polymeric material. The process is particularly related to formed, filled and sealed molded containers.

6 Claims, 6 Drawing Sheets

MOLD, MOLDING ASSEMBLIES AND MOLDING PROCESSES

This is a continuation of PCT Application PCT/IN2007/000033 filed Jan. 29, 2007, which in turn claimed the priority of Indian Application No. 141/MUM/2006. filed Jan. 30, 2006, the priority of both applications is hereby claimed and both applications are hereby incorporated by reference.

This invention relates to a mold, molding assemblies and molding processes.

In particular, this invention relates to molding process for the malting of containers, typically bottles by blow molding extrusion or vacuum extrusion or reduced pressure molding.

In accordance with another aspect of the invention, the invention relates to a mold for carrying out the molding process of this invention.

Hitherto, it is possible to make only a single tier having an array of filled containers in the conventional form filled molding process using a conventional mold.

OBJECTS OF THE INVENTION

An object of this invention is to produce a two tier array of filled containers, which to the knowledge of the inventor is unknown in the prior art.

According to one aspect of this invention there is provided a mold for molding two tiers of containers each tier containing an array having at least one container in the array, said mold comprising i. a lower tier main mold and an upper tier main mold located operatively above said lower tier main mold; said main molds being in two separate halves and displaceable from a normally open configuration to an operative closed configuration along a vertical axis; each of said main molds defining at least one cavity for forming bodies from a parison, of at least one container in said upper and one container in said lower tier respectively in the closed configuration of said main molds; said upper tier main mold further defining at least one cavity complementary to the cavity in said lower tier main mold for defining and forming of the neck region of the body of the at least one container formed in the lower tier main mold and sealing the said lower tier formed container in the operative closed configuration of the upper tier main mold;

ii. a head mold located operatively above said upper tier main mold, said head mold adapted to be displaced from a normally open and parted configuration to a closed configuration in which the two halves of the head mold close to form a neck region for the body of the containers formed in the cavity of said upper tier main mold and seal the so formed container/s;

iii. a parison holder having at least one cavity for locating and holding at least one parison for forming at least one set of upper and lower tier containers along said vertical axis and spanning the said main molds and the head mold; and iv back plates for moveably holding said main molds, head mold and parison holder in relation to each other;

According to another aspect of this invention there is provided a molding assembly for molding two tiers of containers each tier containing an array having at least one container in the array, said assembly comprising {I} a mold as described in accordance with the first aspect;

{II} at least one filling nozzle located above the mold and in alignment with the cavities in the upper and lower tier main molds and the cavities of the head mold and parison holder said nozzle displaceable along said vertical axis, in an extended, partially retracted and fully retracted configuration along said vertical axis for filling formed lower tier container/s, filling formed upper tier container/s and for enabling sealing of the formed and filled upper tier container/s respectively in each of said configurations; and {III} means for sequentially closing the lower tier main mold; upper tier main mold and head mold and for extending and retracting said nozzle/s to form, fill and seal said lower and upper tier container/s.

In accordance with a further aspect of this invention there is provided a process for molding two tiers of containers each tier containing an array having at least one container in the array, said process comprising the following steps a. providing a mold as claimed in claim 1 having upper and lower tier main molds and a head mold;
b. providing a molding assembly as claimed in claim 2 having controllably extendable and retractable nozzle/s;
c. forming a parison by extrusion;
d. locating said formed parison to span cavities of said open main molds and said open head mold;
e. closing said lower tier main mold and forming a body of a lower tier container from the segment of the parison in the cavity of said lower tier main mold;
f. extending said nozzle into said formed body of lower tier container;
g. controllably discharging material from nozzle into said body of lower tier container;
h. partially retracting said nozzle from said lower tier container to locate it about the cavity in the head mold;
i. closing said upper tier main mold to (i) form, from the segment of parison lying in lower region of upper tier main mold in communication with lower tier main mold cavity a neck region for the lower tier container and sealing said formed lower tier container (ii) to form, from the segment of the parison in the upper cavity of the upper tier main mold the body for the upper tier container;
j. controllably discharging material from nozzle into said body of upper tier container;
k. retracting said nozzle from said head mold and completely out of said mold;
l. closing said head mold to form, from the segment of parison lying in said head mold cavity, a neck region for the upper tier container and sealing said formed upper tier container;
m. opening said parison holder; head mold and main molds to remove said formed, filled and sealed upper and lower tier containers; and
n. repeating the cycle of steps a to m to form further two tier containers.

The invention will now be described with reference to the accompanying drawings, in which FIG. 1 is a conventional form fill mold;

FIG. 2 a view of the mold of FIG. 1 showing the single tier array;

Figure 1:
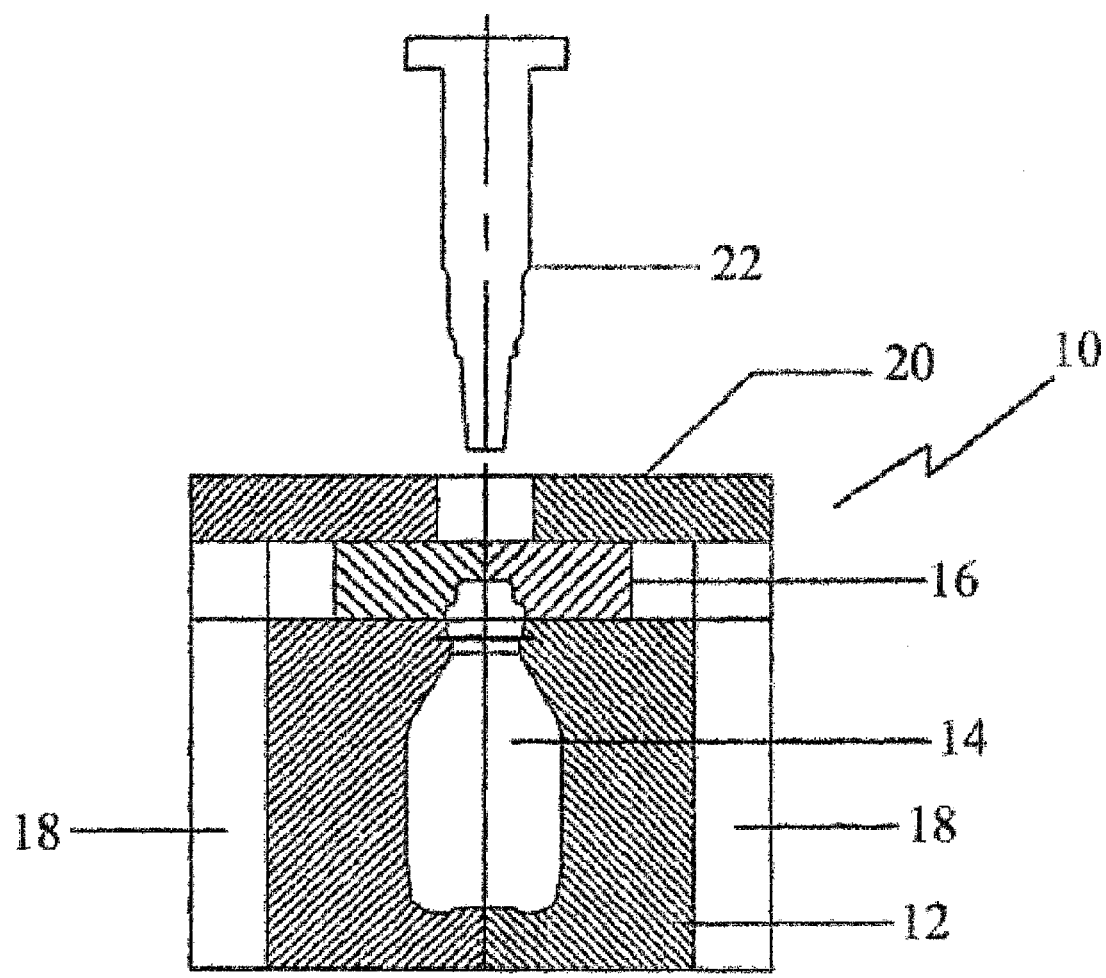

Referring to the drawings, Molding is typically done in a mold. A schematic view of a conventional forming and filing mold is shown in FIG. 1 of the accompanying drawings. Existing molds, generally indicated by the reference numeral 10 have a main mold 12 which defines the cavity 14 for the bottle or other container to be molded. Operatively above the main mold 12 is the head mold 16. The main 12 and head mold 16 are supported by mold back plates 18 which are in turn supported on carriages [not shown] of the molding machine [not shown]. The head mold 14 and the main mold 12 are typically split molds. These molds open and close for receiving a parison and carrying out the molding operation. "Parison" in blow molding, refers to the hollow tube of plastic melt extruded from the die head, and expanded within the mold cavity, typically by air pressure or vacuum to produce the molded part.

Figure 2:
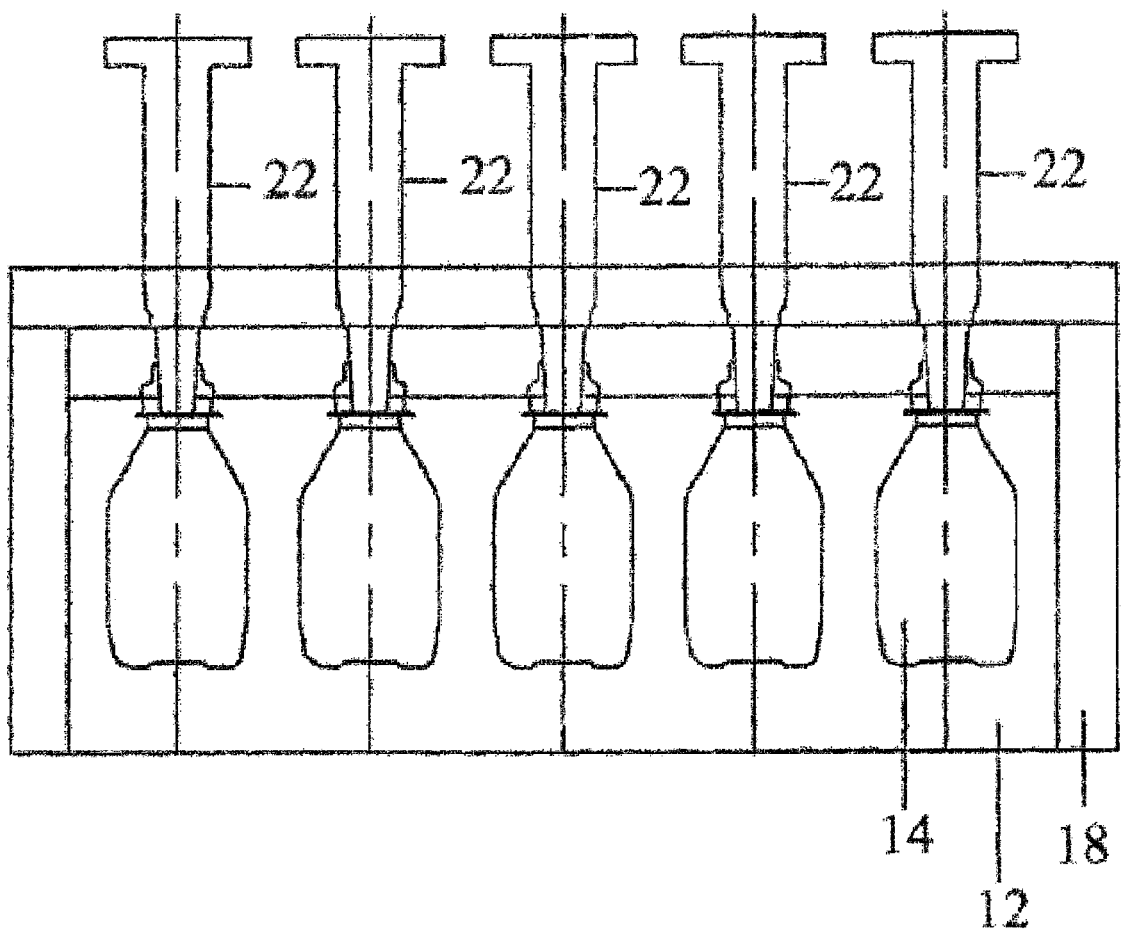

The movement of the main mold and the head mold are not synchronous. The body of the bottle or other container is molded in the main mold. The neck and sealing is done at the head mold. Located operatively above the head mold is the parison holder 20 which holds the parison in place and assists in transferring the parison [not shown] from the parison forming station [not shown] to the molding station [not shown]. The container is filled with it contents during the molding operation itself. For this filing operation a retractable nozzle 22 is fitted above the mold. Although one cavity is shown in FIG. 1. Typically, form filing molds are multi cavity molds. FIG. 2 of the accompanying drawing shows a mold with five cavities. Typically hydraulically operated fixtures are fitted to the molding machine. The motion of these fixtures have process controlled timers which carry out the molding operation in a carefully timed sequence of operations. During the molding operation the filing nozzles extend into the cavity for filing the desired contents into the bottles and retract through the aperture in the parison holder plate for the final molding and sealing operation.

Figure 3:
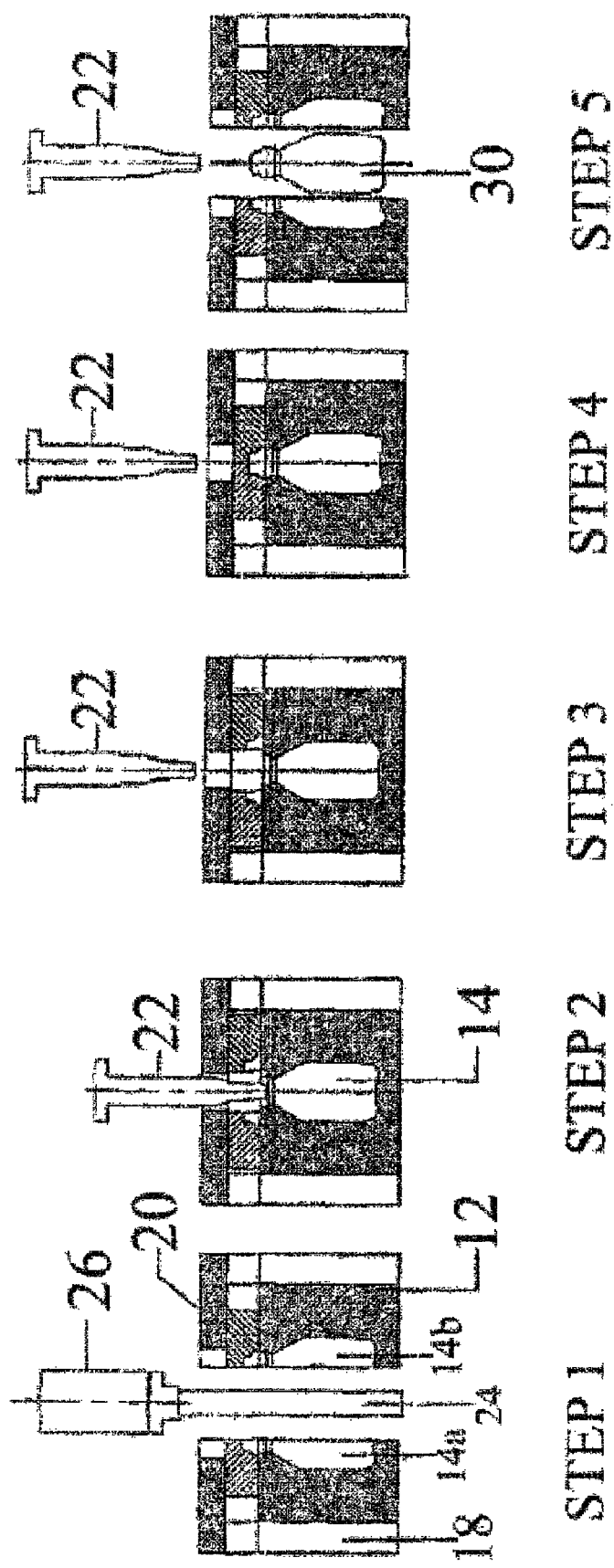
FIG. 3 are the typical steps of a conventional molding process using the mold of FIG. 1.

The typical steps of the prior art molding operation is seen in FIG. 3 of the accompanying drawings. As seen in FIG. 3, Step 1 is the schematic situation at the parison station, in which a parison 24 exuded by an extruder 26, is located at the parison station in the mold 10. This parison 24, which is molten plastic extrudate comes out in the form of a circular tube through pre designed die and punch is eventually held in place by the parison holder and the mold 10 is transferred to the filling station as seen in step 2 of FIG. 3. Typical plastic materials are polyethylene or polypropylene and mixtures thereof. As seen in step 2, the main mold 12 has closed sealing the operative lower end of the parison and contouring the eventual body of the container. In a vacuum operation, low pressure is created in the cavity, 14 causing the forming of the body at a predetermined temperature and for a predetermined amount of time. At a set time, the nozzle 22 bearing the material to be filled into the container is extended from the operative top into the formed container body. In the step 3 shown in FIG. 3, the nozzle is retracted from the container after depositing the desired material, typically, a fluid or a liquid in the container. In step 4, the head mold 14 is now moved to form the neck and head of the container and seal the filled container. In step 5, which is the final step of the operation, the mold opens to release the formed container 30 in accordance with the prior art.

Figure 4:
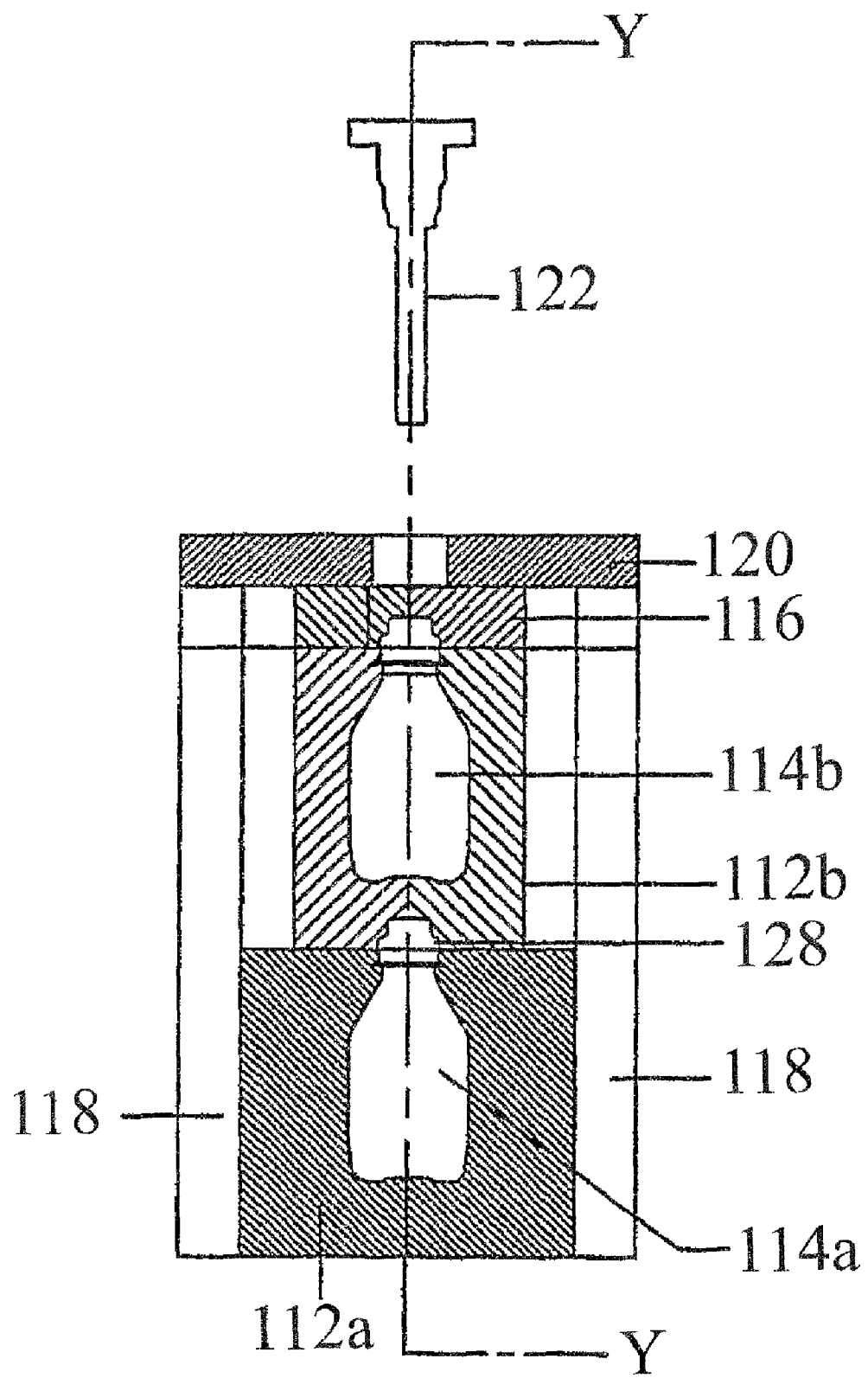
FIG. 4 is the mold in accordance with this invention.
Figure 5:
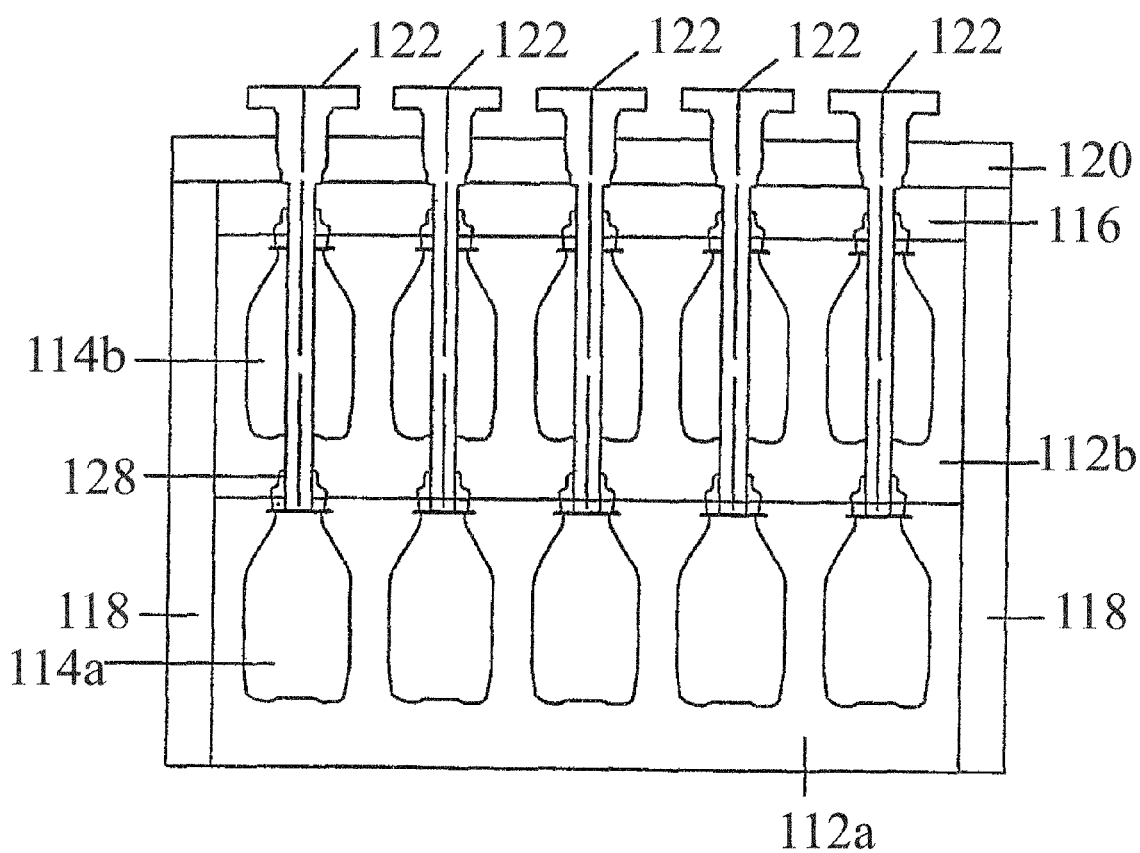
FIG. 5 is another view of the mold of FIG. 4 showing the two tier construction.
Figure 6:
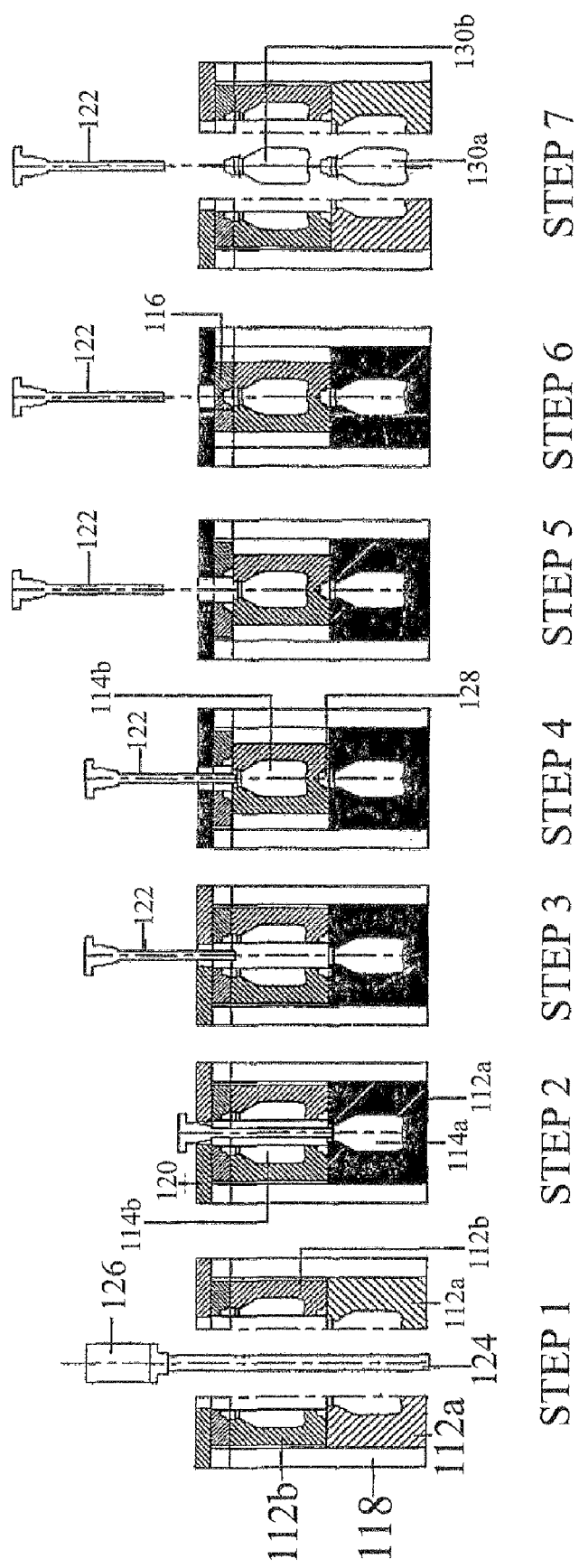
FIG. 6 are the typical steps of a conventional molding process using the mold of FIG. 4.

FIGS. 4, 5 and 6 are the corresponding figures for the mold 100 and the molding process in accordance with this invention.

The reference numeral 100 generally indicates the mold in accordance with this invention. The mold 100 has two main molds 112a and 112b which define cavities 114a and 114b for the bottles or other containers to be molded. Operatively above the main mold 112b is the head mold 116. The main molds and the head molds are supported by mold back plates 118 which are in turn supported on carriages [not shown] of the molding machine [not shown]. The head mold 116 and the main mold 112a and 112b are typically split molds. These molds open and close for along a vertical axis 'YY' for receiving a parison and carrying out the molding operation.

The movement of the main molds 112a and 112b and the head mold 116 are not synchronous. There is a carefully timed sequence in which first the lower tier main mold closes, then the upper tier main mold closes, then the head mold closes, to form, fill and seal the upper and lower tier containers. Then all three molds open to eject the formed tiered containers and receive a fresh parison for molding. This cycle is repeated in a carefully timed sequence. The bodies of the bottles or other containers are molded in the main molds 112a and 112b. There is however a difference between the molding operation in accordance with this invention and the molding operation of the prior art. The neck and sealing of the top tier of containers is done by the head mold 116, while the neck and sealing of the lower tier of containers is accomplished by the formation 128 in the main mold 112b. Thus the main mold 112B acts as the head mold for the lower tier of containers. Located operatively above the head mold 116 is the parison holder 120 which holds the parison in place and assists in transferring the parison 122 from the parison forming station [as seen schematically in FIG. 6] to the molding station. The containers are filled with it contents during the molding operation itself as will be particularly described hereinafter. For this filing operation a retractable nozzle 122 is fitted above the mold. Although one cavity is shown in FIG. 4. Typically, the form filing molds in accordance with this invention are multi cavity molds FIG. 5 of the accompanying drawing shows a mold with five cavities. Typically hydraulically operated fixtures are fitted to a carriage [not shown] of the molding machine assembly which are well known in the art. The motion of these fixtures have process controlled timers which carry out the molding operation in a carefully timed sequence of operations. During the molding operation the filing nozzles extend first into the cavities 114a of the lower tier of formed container for discharging the desired contents into the lower tier of the bottles. These nozzles are then made to retract partially until they lie in the second array of cavities 114b. The nozzles then discharge into the second or upper tier of cavities 114b and then retract completely through the aperture in the parison holder plate for the final molding and sealing operation of the upper tier of containers.

The typical steps of the molding operation in accordance with this invention is seen in FIG. 6 of the accompanying drawings. As seen in FIG. 6, Step 1 is the schematic situation at the parison forming station, in which an extruded parison 124 is located in the mold 100 by means of the extruder 124. This parison 124, is relatively longer than the parison 22 in the prior art. In the remaining steps as seen in FIG. 6, the parison 122 is not shown but its location and placement can be easily understood. As seen in step 2, of FIG. 6, the main mold 112A is closed sealing the operative lower end of the parison 124 and contouring the parison segment to form the eventual body of the lower tier of containers. In a vacuum operation, low pressure is created in the cavity, 114a causing the to parison to be formed into the body at a predetermined temperature and for a predetermined amount of time. At a set time, the nozzle 122 bearing the material to be discharged into the containers is extended from the operative top into the formed container body in the cavity 114a. The nozzle 122 is relatively longer than the nozzle of the prior art molding apparatus as seen in FIG. 3. In the step 3 shown in FIG. 3, the nozzle 122 is partially retracted from the mold, until it lies in the region of the head mold 116. In step 4, the main mold 112b is now moved to close the cavity 114b. This operation has a dual function, in the lower portion of the main mold 112b, there is the cavity 128 for forming the parison segment lying in the neck region and sealing the lower tier of containers. In the upper region the body for the upper tier of containers is formed. The partially retracted nozzle now discharges material into the upper tier cavities 114b. In step 5, the nozzle 122 is completely retracted. In step 6 the head mold 116 is now closed to form the neck and head of the upper tier of containers and seal the filled upper tier of containers. In step 7, which is the final step of the operation, the mold opens to release the formed containers 130a and 130b in accordance with the invention. This cycle of operations is repeated and the mold is moved back to the parison forming station for the next cycle. Typically molding temperatures are in the range of 150 to 220 degrees Celsius in a reduced pressure of typically 0.5 atmosphere. Mold resident time is typically 15 seconds.

In the two tier mold envisaged in accordance with this invention, molding compositions are introduced in the cavities in one tier first typically the bottom tier and thereafter in the top tier after a lag time of typically one second. The formed molded containers are ejected from the mold simultaneously.

Thus, this invention relates to a novel mold being a mold in the form of a tandem staggered mold for making such containers. The mold in accordance with this invention is a two tier mold in which two tiers of containers can be molded in a single molding operation.

In accordance with another aspect of the invention, it relates to a molding process in which a two arrays of filled containers can be molded in a single molding process.

The mold is typically made of stainless steel.

The molding process envisaged will be able to produce almost twice the quantity in the same time without compromising on quality.

The multi/single cavity tandem mould can be used for making of containers in the volume range of 0.1 ml to any volume typically one lire and can be used for automatic vacuum forming or blow forming and liquid and gas filling and sealing.

While considerable emphasis has been placed herein on the steps and molding apparatus of the preferred embodiments, it will be appreciated that many permutations and combinations of the process steps and the components can be made and that many changes can be made in the preferred scheme without departing from the principles of the invention. For instance, it is possible to fill different materials in different containers by sourcing the nozzle from different sources. Again, by using different nozzle sets at different locations it may be possible to fill different materials in the lower and upper tier. These and other changes in the preferred process steps as well as other steps of the process of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A mold for molding two tiers of containers each tier containing an array having at least one container in the array, said mold comprising
   i. a lower tier main mold and an upper tier main mold located operatively above said lower tier main mold; said main molds being in two separate halves and displaceable from a normally open configuration to an operative closed configuration along a vertical axis; each of said main molds defining at least one cavity for forming bodies from a parison, of at least one container in said upper and one container in said flower lower tier respectively in the closed configuration of said main molds; said upper tier main mold further defining at least one cavity complementary to the cavity in said lower tier main mold for defining and forming of the neck region of the body of the at least one container formed in the lower tier main mold and sealing the said lower tier formed container in the operative closed configuration of the upper tier main mold;
   ii. a head mold located operatively above said upper tier main mold, said head mold adapted to be displaced from a normally open and parted configuration to a closed configuration in which the two halves of the head mold close to form a neck region for the body of the containers formed in the cavity of said upper tier main mold and seal the so formed container/s;
   iii. a parison holder having at least one cavity for locating and holding at least one parison for forming at least one set of upper and lower tier containers along said vertical axis and spanning the said main molds and the head mold; and
   iv. back plates for moveably holding said main molds; head mold and parison holder in relation to each other.

2. A mold for molding two tiers of containers as claimed in claim 1, in which each array has a plurality of cavities for simultaneously molding a plurality of containers in both tiers.

3. A molding assembly for molding two tiers of containers each tier containing an array having at least one container in the array, said assembly comprising
   {I} a mold as claimed in claimed in claim 1;
   {II} at least one filling nozzle located above the mold and in alignment with the cavities in the upper and lower tier main molds and the cavities of the bead mold and parison holder said nozzle displaceable along said vertical axis, in an extended, partially retracted and fully retracted configuration along said vertical axis for filling formed lower tier container/s, filling formed upper tier container/s and for enabling sealing of the formed and filled upper tier container/s respectively in each of said configurations; and
   {III} means for sequentially closing the lower tier main mold; upper tier main mold and head mold and for extending and retracting said nozzle/s to form, fill and seal said lower and upper tier container/s.

4. A process for molding two tiers of containers each tier containing an array having at least one container in the array, said process comprising the following steps
   a. providing a mold as claimed in claim 3 and having upper and lower tier main molds and a head mold;
   b. providing a molding assembly as claimed in claim 3 having controllably extendable and retractable nozzle/s;
   c. forming a parison by extrusion;
   d. locating said formed parison to span cavities of said open main molds and said open head mold;
   e. closing said lower tier main mold and forming a body of a lower tier container from the segment of the parison in the cavity of said lower tier main mold;
   f. extending said nozzle into said formed body of lower tier container;
   g. controllably discharging material from nozzle into said body of lower tier container;
   h. partially retracting said nozzle from said lower tier container to locate it about the cavity in the head mold;
   i. closing said upper tier main mold to (i) form, from the segment of parison lying in lower region of upper tier main mold in communication with lower tier main mold cavity a neck region for the lower tier container and sealing said formed lower tier container (ii) to form, from the segment of the parison in the upper cavity of the upper tier main mold the body for the upper tier container;

j. controllably discharging material from nozzle into said body of upper tier container;

k. retracting said nozzle from said head mold and completely out of said mold;

l. closing said head mold to form, from the segment of parison lying in said head mold cavity, a neck region for the upper tier container and sealing said formed upper tier container;

m. opening said parison holder; head mold and main molds to remove said formed, filled and sealed upper and lower tier containers; and n. repeating the cycle of steps a to m to form further two tier containers.

5. A process for molding two tiers of containers as claimed in claim 4, in which the containers are formed by vacuum process.

6. A process for molding two tiers of containers as claimed in claim 4, in which the molding temperatures are in the range of 150 to 220 degrees Celsius in a reduced pressure of typically 0.5 atmosphere and each cycle is about 15 seconds.

* * * * *